United States Patent [19]
Hohman

[11] Patent Number: 5,637,375
[45] Date of Patent: Jun. 10, 1997

[54] COMPOSITE PRODUCTS AND METHOD OF PREPARATION

[75] Inventor: Alvin E. Hohman, Dallas, Tex.

[73] Assignee: Loral Vought Systems Corporation, Grand Prairie, Tex.

[21] Appl. No.: 456,756

[22] Filed: Jun. 1, 1995

Related U.S. Application Data

[62] Division of Ser. No. 146,214, Jan. 20, 1988.

[51] Int. Cl.$^6$ ..................................... B32B 5/12
[52] U.S. Cl. ................ 428/113; 428/114; 428/298.1; 428/301.4
[58] Field of Search .................. 428/112, 233, 428/236, 113, 114, 227

[56] References Cited

U.S. PATENT DOCUMENTS

| | | | |
|---|---|---|---|
| 3,889,035 | 6/1975 | Jakes | 428/227 |
| 3,900,650 | 8/1975 | Sedore | 428/86 |
| 3,962,394 | 6/1976 | Hall | 264/90 |
| 4,081,582 | 3/1978 | Butterworth et al. | 428/284 |
| 4,142,016 | 2/1979 | Perry | 428/284 |
| 4,201,247 | 5/1980 | Shannon | 138/141 |
| 4,269,884 | 5/1981 | DellaVecchia et al. | 428/131 |
| 4,385,955 | 5/1983 | Doerfling et al. | 156/245 |
| 4,464,192 | 8/1984 | Layden et al. | 65/18.1 |
| 4,636,344 | 1/1987 | McDougall | 264/102 |

FOREIGN PATENT DOCUMENTS

| | | |
|---|---|---|
| 0127553 | 12/1984 | European Pat. Off. . |
| 2039821 | 8/1980 | United Kingdom . |

OTHER PUBLICATIONS

Kirk-Othmer, *Encyclopedia of Chemical Technology*, 3rd Edition, John Wiley & Sons, 1981, Supplemental vol., pp. 268–281 under the heading "Composites, High Performance," and vol. 13, pp. 968–978 under the heading Laminated and Reinforced Plastics.

*Primary Examiner*—Christopher Raimund
*Attorney, Agent, or Firm*—Richards, Medlock & Andrews

[57] ABSTRACT

Fiber reinforced composite products of enhanced interlaminar ply strength and processes of producing same. In forming the products, layers of fibrous reinforcing material and resinous matrix material are established. The matrix material contains unset resin and short fibers of an average particle length of 0.2–0.6 mm in a weight ratio of short fibers to resin in the range of 0.4–1. The reinforcing material comprises fibers of a length substantially greater than the length of the short fibers in the matrix material. The fiber and matrix layers are integrated in order to cause the resin and short fibers which comprise the strengthened matrix material to enter into the interstitial spaces of the longer fiber reinforcing material. Thereafter, the matrix resin is solidified in order to arrive at the fiber reinforced composite product. Alternate fiber and matrix layers may be built up on a surface while a pressure gradient is established from the outside of the built up layers to the surface in order to cause the resin to flow across the interfacial boundaries of the resin and fiber layers. The flow across the resin fiber interfaces promotes orientation of the short fibers in a direction across the interfaces so that the short fibers enter into the interstitial spaces between the reinforcing fibers.

17 Claims, 1 Drawing Sheet

COMPOSITE PRODUCTS AND METHOD OF PREPARATION

CROSS REFERENCE TO RELATED APPLICATION

This is a division of U.S. patent application Ser. No. 07/146,214 filed Jan. 20, 1988, pending.

TECHNICAL FIELD

This invention relates to fiber reinforced composite products and more particularly to composite products of enhanced interlaminar strength and methods for the production of such products.

ART BACKGROUND

High performance composite structures such as are used in forming surface skin components of aircraft and space vehicles usually are formulated of fiber reinforced plastic compositions. Such materials include glass fibers such as E-glass or S-glass fibers, boron or carbon fibers, and aramid fibers such as the products identified as Kevlar fibers. The plastic matrix materials useful in the formation of such composites include polyester and epoxy resins, polyimides, polyamides, polybutadiene resins and vinyl ester polymers. Such materials can be cured by cross linking at temperatures ranging from room temperature up to about 400° F. to 600° F. or by application of chemical cross linking agents. Where the structures are to be subjected to high temperature conditions as in the case of radomes for high performance aircraft and heat shields for space vehicles, thermosetting resins such as those described above usually will be employed in the matrix material. In other cases, where less severe conditions are to be encountered, thermoplastic resins can be employed as the matrix material although in most cases thermoset resins are used.

In forming products having relatively simple shapes such as flat sheets or rectangular polyhedra, layup and bagging techniques can be prepared with a fair degree of success. For example, Kirk-Othmer, "Encyclopedia of Chemical Technology," 3rd Edition, 1981, Supplement Volume at pages 268–270, discloses a process for preparing a flat composite product by placing a carbon-fiber-epoxy prepreg layup on a flat tool surface. The layup is covered with breather plies and a nylon bag is placed over the breather plies and sealed at its edges to the tool surface. A vacuum is pulled upon the sealed assembly in order to evacuate air from the layup. The assembly is placed in an autoclave, heated and pressurized to effect a cure cycle.

A similar approach has been proposed for use in molding three dimensional composite structures. For example, as disclosed in U.S. Pat. No. 3,962,394 to Hall, a cylindrical or rectangular tubular mandrel is coated with a resin fiber layer which is surrounded by a compression Sleeve formed of a thin film of nylon or rubber which is perforated with holes and split lengthwise. A layer of absorbent material is placed around the split compression sleeve and this assembly is surrounded by a plastic bag or bladder which is sealed at both ends to the tubular mandrel. The bladder is evacuated in order to cause the compression sleeve to compact the layers and expel trapped air and excess resin from the fiber-resin material through the holes in the compression sleeve.

Typically, in forming plastic composite products 5–10, sometimes more, plies of fiber mats are integrated together with intervening applications of resinous material matrix material to arrive at the final product. Each fiber ply comprise fibers which are oriented generally in a two dimensional surface of the ply, e.g., in a plane in the case of a flat composite product or in the wall of a cylinder in the case of a cylindrical product. The fiber ply may be of a continuous strand type as in the case of a filament wound on a molding tool. Alternatively, the fiber material may be formed of a plurality of generally parallel continuous fibers, e.g. in the form of an "unidirectional tape", or it may comprise chopped fibers aligned in an unidirectional manner. Such chopped fibers typically are of a length within the range of 0.1–3 centimeters.

In addition, the fiber mat may take the form of a braided structure in which the fibers extend predominantly along one direction but are braided or woven together, normally to provide an angle between strands, the "braid angle" of about 15°–45°. A fabric type structure in which fibers are interconnected by cross-strands intersecting at about 90° may also be employed. The fiber layers may be in the form of prepregs in which the fibers are impregnated with an uncured resin which is later crosslinked in order to provide matrix material.

As described in Kirk-Othmer, Encyclopedia of Chemical Technology, 3rd Edition, 1981, Vol. 13, pp. 968–978 under the heading "Laminated and Reinforced Plastics" and in the Supplement Volume, pp. 260–281, under the heading "Composites, High Performance," various procedures are available for forming fiber reinforced plastic composites. A basic approach involves a technique in which fiber layers, which may or may not be prepregs containing resin, are disposed on a forming tool and resin, usually an uncured thermosetting resin, is either sprayed or painted on the fiber layers. Additional fiber layers and resin layers are added until the desired thickness is achieved and the resulting lay-up is then cured to produce the final product. The lay-up structure can be squeezed together under a light force in order to force the resin and fibers into intimate contact. Curing can take place under an applied pressure. Other processes useful for forming cylindrical products involve the winding of a fiber filament around an internal mandrel. The filament is wound onto a rotating mandrel and resinous matrix material applied, either by running the filament through a tank of uncured liquid resin or by spraying or painting the liquid onto the fiber filament as it is disposed on the mandrel.

In some composite products, it is desirable that the composite fiber plies be in close Juxtaposition to one another with the resin material intimately mixed therewith. In other procedures, pronounced layering or lamination occurs. For example, U.S. Pat. No. 4,269,884 to DellaVecchia et al discloses a process of forming a stampable thermoplastic sheet which comprises several more or less discrete layers. In the DellaVecchia procedure, outer layers are formed of a thermoplastic resin which may optionally contain up to 50% of a particular filler and up to 45% of nonsiliceous fibers having a length ranging from about 0.01 to ¾ of an inch. The fibers are generally oriented two dimensionally in a plane parallel to the plane of the sheet. Inside of the outer layer another resinous sheet is provided. This is in a molten state during the processing procedure to allow the internal fiber mats to be impregnated by the resin. Fiber mats are disposed upon an internal supporting screen. The fiber and resin layers are passed through rollers which apply a pressure to the sheets of between 1000 to 1500 per linear inch to ensure bonding of the several layers and impregnation of the fibers by the adjacent thermoplastic molten resin. The DellaVecchia procedure is carried out in a manner to prevent migration from one layer to the next, specifically the process is carried out to avoid migration of the long reinforcing fibers to the outer resinous layer and also to avoid migration of the short fibers, if present in the outer resin layer, into the reinforcing layer.

SUMMARY OF THE INVENTION

In accordance with the present invention, there is provided a new and advantageous process for the formation of fiber reinforced composite materials of enhanced interlaminar ply strength. In carrying out the invention, layers of fibrous reinforcing material and unset resinous matrix material are established. The matrix material contains unset resin and short reinforcing fibers having an average particle length within the range of 0.2–0.6 mm. The fibers are present in the matrix material to provide a weight ratio of short fibers to resin in the range of 0.4–1. The reinforcing material comprises fibers, which may be any suitable form, for example, a continuous strand, unidirectional chopped fibers, or woven fibers. The reinforcing fibers are of a length substantially greater than the length of the short fibers in the matrix material. Reinforcing fibers typically will range in size from about 3 cm up to the length of the product, for example, in the case of unidirectional tape layups. In the case of filament wound around a rotating mandrel or other molding tool, the fiber strand, of course, may be continuous. The fiber and matrix layers are integrated in order to cause the resin and short fibers which comprise the strengthened matrix material to enter into the interstitial spaces of the longer fiber reinforcing material. Thereafter, the matrix resin is solidified in order to arrive at the fiber reinforced composite product.

In a further aspect of the invention, a plurality of layers of resinous matrix material and fibrous reinforcing material are provided. The layers of matrix material contain liquid resin and short reinforcing fibers. The layers of reinforcing material contain fibers having an average fiber length substantially greater than the average fiber length of the short fibers in the matrix material. The fiber layers and a matrix material layers are integrated by alternately disposing the matrix layers and the fiber layers on a forming surface. The forming surface may be of any desired configuration. For example, it may be a cylindrical or conical mandrel, a concave or convex shape such as in forming aircraft panel components, or simply a flat planar surface. As alternate fiber and matrix layers are built up on the surface, a pressure gradient is established from the outside of the built up layers to the forming surface in order to cause the resin to flow across the interfacial boundaries of the resin and fiber layers. The pressure gradient may be initiated at the conclusion of stacking of the fiber and resin layers or it may be initiated at an intermediate point in the buildup process. In either case, the flow across the resin fiber interfaces, promotes orientation of the short fibers in a direction across the interfaces so that the short fibers enter into the interstitial spaces between the reinforcing fibers. At the conclusion of the buildup procedure, the resin is solidified to produce the fiber reinforced composite material. Solidification can take place during pressurization of the built up layers or the pressure may be released and the material then solidified.

Yet a further aspect of the invention involves a fiber reinforced composite product. The product comprises a plurality of plies of fiber reinforcing mats formed of elongated fibers oriented generally along the two dimensional surface dimensions of the reinforcing mats. The mats may take the form of braided structures or unidirectional oriented fiber, e.g. as formed by a continuous strand or by a plurality of generally parallel strands. In addition, the fiber reinforcing mats may comprise chopped fibers, either aligned unidirectionally, or braided, or even randomly oriented. The composite further comprises a resin material providing a matrix in which the fiber reinforcing mats are disposed. Short interlocking fibers having an average length within the range of 0.2–0.6 mm are disposed in the resin in a three-dimensional orientation and extend into the interstitial spaces between the elongated fibers of the reinforcing fiber plies.

A further application is in the formation of shaped composite structures based upon thermoset resins which are subject to shrinkage when they are crosslinked and particularly in producing such structures formed of several components which are molded separately and then bonded together. The mating components are formed from a plurality of layers of fiber reinforcing material of elongated fibers which are integrated with a resinous matrix material comprising an uncured thermoset resin and short reinforcing fibers. The components are then cured to crosslink the thermoset resin to cause the components to solidify in the desired shapes. The component parts are then Joined together along their conforming mating surfaces to provide the final shaped composite products.

DETAILED DESCRIPTION OF THE INVENTION

Figure 1:
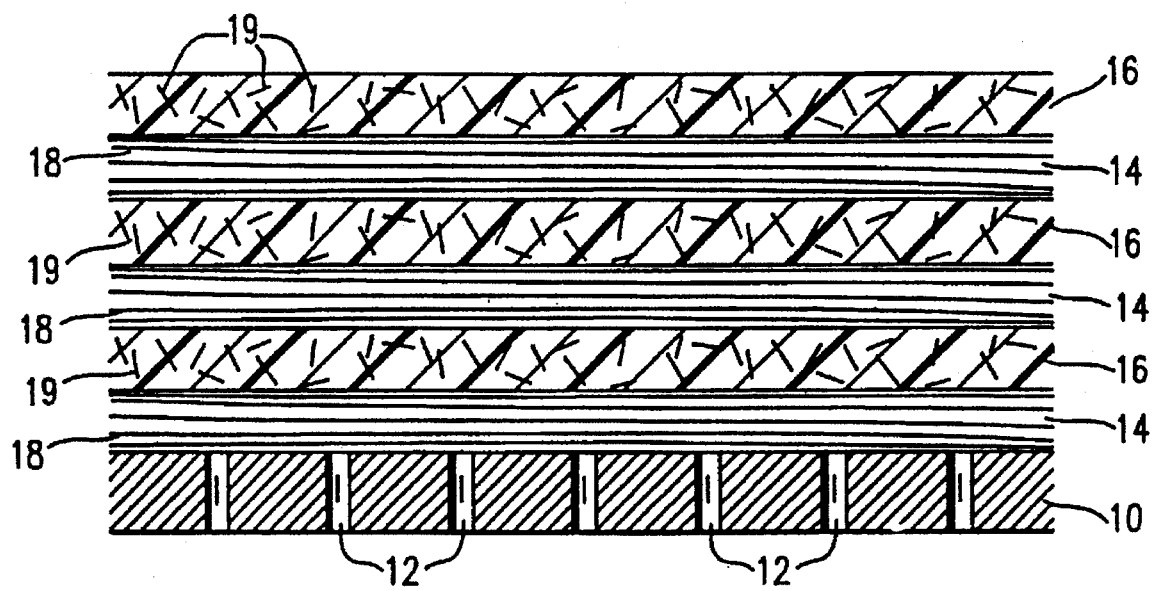
FIG. 1 is a schematic sectional view showing a plurality of alternately disposed layers of fiber mats and resin materials built up on a forming surface.

As noted previously, various procedures may be used in forming fiber reinforced composite materials. Such general procedures as those disclosed in the aforementioned Kirk-Othmer articles may be employed in carrying out the present invention, provided they are implemented in a manner to arrive at a well-integrated structure in which the fiber plies are in close juxtaposition to one another to provide a relatively homogeneous cross section in which the matrix material is infused within the fiber plies without resin rich laminates between the fiber plies. Such structures may be contrasted with highly laminated structures such as those produced by procedures as disclosed in the aforementioned DellaVecchia patent, which are carried out in a manner to retard migration between successive layers.

The various resin and fiber materials disclosed in the aforementioned Kirk-Othmer articles also may be employed in carrying out the invention. The invention is particularly applicable to thermoset composites, i.e., materials which are cured at the conclusion of the layup procedure by cross linking. However, the invention may also be carried out employing thermoplastic composites in which the resinous matrix materials are retained in the thermoplastic state. When employing thermoplastic resins, the composite forming procedure is carried out at temperatures above the thermoplastic melt points of the resins involved, and solidification of the resinous matrix material to arrive at the composite is accomplished by cooling the structures to appropriate temperatures well below the processing points. Fiber-resin formulations of both the thermoset and thermoplastic type are disclosed in the aforementioned Kirk-Othmer articles "Composites, High Performance" pp.

260–281 of the Supplement Volume and "Laminated and Reinforced Plastics, pp. 968–978 of Vol. 13. The entire disclosures of these Kirk-Othmer articles are incorporated herein by reference.

In fiber reinforced composite structures, the fiber reinforcing plies are the predominant load bearing members and the resinous matrix materials function primarily to hold the fiber plies together. In the idealized case, complete penetration of the matrix resin into the fabric plies occurs with little or no resin enriched zones between the plies. Even when the idealized case is approached, a significant fatigue point in composite structures is interlaminar failure between the fiber plies. The present invention provides composite structures of substantially enhanced interply strength. This is accomplished through the use of a matrix resin containing extremely short fibers which function in conjunction with the resin to interlock the fiber layers together.

In experimental work carried out respecting the invention, composite test panels were prepared using various concentrations of short fibers of different lengths. The test panels were formed on 6"×24" aluminum plates by braiding continuous fiber strands on the aluminum plates with an application of a resin and short fiber mixture between the fiber plies. Each fiber ply was composed of two successive braided layers. The braid angles, as measured with respect to a braid axes extending longitudinally of the aluminum mandrel were usually 30°, although in a few cases braid angles of 15° were employed. The resin base used for the matrix was an epoxy resin identified as Epon 815 from Shell Chemical Company. The hardener for the resin was HY-906 and the accelerator, DY-062, both from Ciba Geigy Corp. The fiber employed was a continuous strand of E-Glass yarn available from Owens Corning Fiberglass Corporation. The resin mixture comprised 55 wt % of the Epon 815, 44% of the DY-062 accelerator and 1% of the HY-906 hardener.

The test specimens were prepared using fiber-resin mixtures containing short fibers ranging up in concentration up to 50 wt. % (a ratio of fibers to resins of 1) and having nominal lengths of ¼", ⅟₃₂" and ⅟₆₄. (6.4 mm, 0.8 mm, and 0.4 mm).

In formulating the test specimens, 14 layers of the fiberglass yarn were braided on the aluminum tools with an application of the resin-fiber mixture between each two successive braided layers and also on the surface of the last braided layer. Thus the composite panels comprised 7 plies of fiber (each consisting of two braided layers) and 7 layers of resin-short fiber mixture. After the fiber layers and resin layers were built up, the resulting panels were cut from the tool, placed on an aluminum plate, and then bagged and cured using a technique similar to that disclosed in Kirk-Othmer, Supplement Volume, at pages 268–270. After bagging, a vacuum of 29" of mercury was applied to the bag and the temperature was increased to 180° F. and held at these conditions for about one and one half hours. The curing of the resin was completed over an additional two hour period by increasing the temperature at a rate of 2° F. per minute to 350° F. while maintaining an applied pressure of 45 psig. After the composite samples were cooled, they were cut into test specimens which were then analyzed for void content in accordance with ADTM D 2734, fiber content by matrix digestion in accordance with ASTM D 3171, and short-beam shear failing stress in accordance with ASTM D 2344. In addition, selected specimens were tested to determine flatwise tensile failing stress to provide an indication of interlaminar strength. These tests were carried out using 2"×2" specimens which were bonded on each side to aluminum blocks and then pulled apart in order to arrive at the tensile failing stress.

The results of the test procedures are set forth in Table I. In Table I, the first column gives the amount of short fiber in the resinous matrix material in wt. %, and the second column gives the average length of the short fibers in the resinous material. The third column sets forth the density of the final product in gms/cm$^3$ and the fourth, fifth and sixth columns give the resin, fiber, and void contents in volume percents. The last two columns set forth the short-beam failing stress and the flatwise tensile failing stress in 1000 psi (KSI).

The short beam failure tests were run in an effort to gain an indication of interlaminar shear failure between successive resin plies. However, while the failure strengths given in column 7 are believed to give a gross indication of sample strength, they are not thought to provide a reliable indication of interlaminar strength. The tensile failing stress, on the other hand, is by its nature a direct indication of interlaminar strength between plies of fibrous reinforcing material.

The data presented in Table I are average values obtained by testing 2 to 5 specimens for each sample run. Standard deviations based upon the square root of the average of squared deviations from the arithmetic mean for the average values are given in parenthesis.

TABLE 1

| RUN | FIBER WT | FIBER LENGTH | DENSITY (gms/cm$^3$) | RESIN VOL (%) | FIBER VOL (%) | VOID VOL (%) | SHORT BEAM STRESS (KSI) | TENSILE STRESS (KSI) |
|---|---|---|---|---|---|---|---|---|
| 1. | 0 |  | 1.79 | 46.1 | 49.7 | 4.2 | 6.08 | 2.80 |
|  |  |  | (.03) | (1.57) | (1.82) | (1.01) | (.3) |  |
| 2. | 10% | ¼" | 1.737 | 50.5 | 45.2 | 4.3 | 4.69 |  |
|  |  |  | (.014) | (1.2) | (.03) | (1.2) | (.14) |  |
| 3. | 20% | ¼" | 1.78 | 48.1 | 48.2 | 3.66 | 6.12 | 2.32 |
|  |  |  | (.008) | (.90) | (.11) | (.80) | (.26) | (.04) |
| 4. | 30% | ¼" | 1.74 | 49.4 | 45.8 | 4.8 | 5.45 |  |
|  |  |  | (.02) | (.60) | (.82) | (.93) | (.22) |  |
| 5. | 30% | ¼" | 1.82 | 46.2 | 50.7 | 3.1 | 1.95 | 2.29 |
|  |  |  | (.018) | (2.45) | (1.81) | (.84) | (.18) | (.137) |
| 6. | 10% | ⅟₃₂ | 1.742 | 43.1 | 49.0 | 7.9 | 5.59 |  |
|  |  |  | (.018) | (.83) | (.50) | (1.1) | (.25) |  |
| 7. | 20% | ⅟₃₂ | 1.68 | 39.4 | 48.3 | 12.3 | 2.89 |  |
|  |  |  | (.02) | (.73) | (1.08) | (.59) | (.07) |  |
| 8. | 30% | ⅟₃₂ | 1.70 | 39.6 | 48.8 | 11.6 | 3.07 |  |
|  |  |  | (.045) | (1.12) | (2.2) | (1.42) | (.27) |  |

TABLE 1-continued

| RUN | FIBER WT | FIBER LENGTH | DENSITY (gms/cm³) | RESIN VOL (%) | FIBER VOL (%) | VOID VOL (%) | SHORT BEAM STRESS (KSI) | TENSILE STRESS (KSI) |
|---|---|---|---|---|---|---|---|---|
| 9. | 30% | 1/32 | 1.746 (.014) | 39.0 (.111) | 51.1 (.61) | 9.9 (.50) | 3.95 (.11) | 2.11 (.18) |
| 10. | 20% | 1/32 | 1.81 (.018) | 36.6 (.69) | 54.7 (1.04) | 8.6 (.47) | 3.94 (.22) | |
| 11. | 10% | 1/64 | 1.79 (.013) | 45.7 (1.35) | 49.5 (.45) | 4.8 (1.14) | 6.39 (.25) | |
| 12. | 30% | 1/64 | 1.74 (.011) | 47.2 (.59) | 47.0 (.73) | 5.8 (.15) | 6.43 (.20) | 3.08 (.14) |
| | 40% | 1/64 | | | | | 5.54 | 3.50 |
| | 50% | 1/64 | | | | | 5.51 | 2.99 |

From an examination of the data presented in Table I, and using Run No. 1 (zero short fiber content) as a control, it can be seen that the composite samples formulated from a resin-short fiber mixture of ¼" fibers showed a decrease in interlaminar strength as indicated by the tensile failing stress procedure and, although the results are erratic, also a decrease in sample strength as indicated by the short-beam shear test. The composite samples over the range of fibers tested (from 10 to 30 wt. % of the resin mixture) seemed generally to deteriorate with increasing of fiber content. The specimens prepared using the 1/32" fibers showed test results conforming closely to those for the ¼" fibers.

For the test specimens prepared using short fibers of a nominal size, 1/64", the short beam failing stress showed a modest increase at fiber concentrations up to 30 wt. % and thereafter a modest decrease with increasing fiber concentration up to 50%. The interlaminar strength as indicated by the tensile failing stress showed an increase at fiber concentrations of 30 and 50% and a very substantial increase when the short fiber content of the matrix resin was 40% fiber and 60% resin.

From the above experimental work it can be seen that the interlaminar strengths of the composite specimens were influenced substantially by the length of the short fibers in the resin material and also by the short fiber concentration in the resin material. The optimum interlaminar strength occurred at a short fiber length of 1/64", at a fiber concentration at a 40/60 fiber-resin mix, corresponding to a weight ratio of short fibers to resin of 0.67.

While the invention is not to be limited by theory, it is believed that the interlaminar strength enhancement reflected by the experimental data can be explained in terms of competing factors involving both the concentration and the length of the short fibers. The short fiber orientation in the liquid resinous matrix material can be characterized as being isotropic in nature, in the sense that fiber orientation occurs in three dimensions rather than being limited essentially to a planar dispersion. Stated otherwise, in describing the fiber orientation by reference to the orthogonal axes of a Cartesian coordinate system in which the x and y axes define the laminar dimensions of the composite and the z axis the cross laminar dimension, the short fibers exhibit a substantial orientation along the z axis rather than being confined to orientation in the plane of the x and y axes. Those short fibers having a substantial z axis coordinate tend to enter into the interstitial spaces between the longer fibers of the fibrous reinforcing plies. The resin also enters into the interstitial spaces, and the short fibers, together with the resin after it is cured or solidified, tend to strengthen the matrix between the plies of fibrous reinforcing material in a manner to enhance the interlaminar strength of the composite structure. In the optimized use of the short fibers, a sufficient amount is used to strengthen the matrix while not so much as to result in a significant loss of strength as described below.

The fibers incorporated in the resinous matrix material, because of their short length, tend to also act in the nature of fillers so that increasing the short fiber content will ultimately result in a decrease in matrix strength, similarly as would be the case with conventional fillers. However if the short fiber concentration is too low, there are not sufficient short fibers to function in an effective manner to interlock the fiber plies together.

If the fibers incorporated into the resinous matrix material are too long, the fiber orientation will tend to shift from the three dimensional dispersion described above to a dispersion in which two dimensional fiber orientation is favored. That is, fiber orientation along the x & y axes of the previously referenced Cartesian coordinate system is enhanced at the expense of fiber orientation along the z axis. The ultimate of this condition Would be the substantially laminar dispersion described in the aforementioned patent to DellaVecchia et al in which little or no Interlaminar migration of the fibers occurs. While as described below, steps can be taken during the formation of the composite structure to cause fiber flow across the laminar interfaces, thus enhancing fiber orientation along the z axis and permitting a greater length of the interlocking fibers; for a given set of conditions, the tendency to orient in the x–y plane will increase with increasing fiber length.

On the other end of the spectrum, if the fibers are made too short, they act in essence like fillers, such that they do not function to interconnect the successive layers of fibrous reinforcing material. Thus, when the short fiber length is decreased from the optimum for a given set of conditions, overall specimen strength, as well as interlaminar strength, will tend to be decreased.

Although as noted below, steps can be taken permitting the use of longer fibers, it is preferred in carrying out the invention to employ reinforcing fibers in the resinous matrix material having an average particle length within the range of 0.2–0.6 mm. The fibers are present in the matrix material in an amount to provide a weight ratio of short fibers to resin matrix material within the range of 0.4–1 and more preferably 0.6–0.8. The short fibers may also be characterized in terms of aspect ratio, i.e. the ratio of fiber length to fiber diameter. Preferably, they will have an aspect ratio within the range of 10–50. While materials such as fillers or other materials to alter the characteristics of the composite material may be employed, they should be used with recognition that they may decrease the overall strength of the product.

The short reinforcing fibers may be dispersed in the liquid resin material by any suitable procedure. A preferred technique is to disperse fibers of a length greater than the desired final length in the resin material, and then mill the resin-fiber mixture under sufficient stress to reduce the average particle size to the desired range of 0.2–0.6 mm. The milling operation tends to promote isotropic (three dimensional) fiber orientation in the resinous matrix material and in addition provides for good dispersion of the fibers, that is, it retards agglomeration of the fibers.

As noted previously, any suitable arrangement of resins (including thermoplastic and thermoset resins) and fibers may be employed in carrying out the present invention. While it usually will be preferred to employ thermoset resins of the type described previously, thermoplastic polymers may also be employed. Suitable thermoplastic resins which are used in formulating composite structures include polyetherether ketone, polypropylene, polystyrene, polyether imides and polyarylene sulfides. In forming composites from such thermoplastic resins, the processing is of necessity carried out at temperatures above the melt point of the resin involved. Usually the materials will be composited under a substantial applied pressure as well; for example, a pressure within the range of 15–250 psi.

The fibrous reinforcing materials used in the invention may likewise be of any suitable type employed in forming composite structures. The reinforcing fibers may take the form of chopped fibers or continuous fiber strands such as employed in unidirectional tapes or braided layups of the type used in the experimental work described above. In braiding, typically 72–216 continuous fibers are integrated with the short fiber-resin strengthened matrix. Where chopped fibers are employed, they may be aligned in a predominantly unidirectional manner or they may be randomly disposed or transversely oriented. Prepreg fiber tapes or fabrics can also be used in carrying out the invention. Where prepregs are used, the short reinforcing fibers as described above may be incorporated into the prepregging resin in addition, or even as an alternative, to short reinforcing fibers incorporated into a separate layer of resinous matrix material.

In accordance with a further embodiment of the invention, fiber orientation across the laminate interfaces, i.e., along the z axis as described above, is promoted, thus permitting use of longer fiber lengths than would otherwise be the case. In this embodiment of the invention, alternate layers of fibrous reinforcing plies and the matrix material (resin and short fibers) are disposed upon a forming surface having a configuration conforming to that of the desired composite product. The forming surface may be provided by a flat or curved forming table or by a mold, e.g. an internal mandrel. A pressure gradient is established across the built up layers of matrix and reinforcing materials to cause the matrix resin and short reinforcing fibers to flow across the boundaries into the fibrous reinforcing material. This cross-laminar flow tends to cause the short reinforcing fibers to orient in the direction of flow thus promoting cross-laminar migration of the fibers.

This embodiment of the invention may be described with reference to FIGS. 1 and 2 which are schematic sectional illustrations taken through a plurality of layers of reinforcing fibers and matrix material disposed upon a suitable forming surface. More particularly and as shown in FIG. 1, a forming structure 10 is provided with a plurality of perforations 12. The layers of fibrous reinforcing material 14 and short fiber-impregnated resin 16, as shown, are disposed on the forming surface of structure 10. As illustrated in FIG. 1, the elongated fibers 18 in the fiber ply layers 14 are oriented generally along the length of the composite buildup. The short fibers 19 in the matrix layers 16 are shown to be randomly oriented in the resin material.

Figure 2:
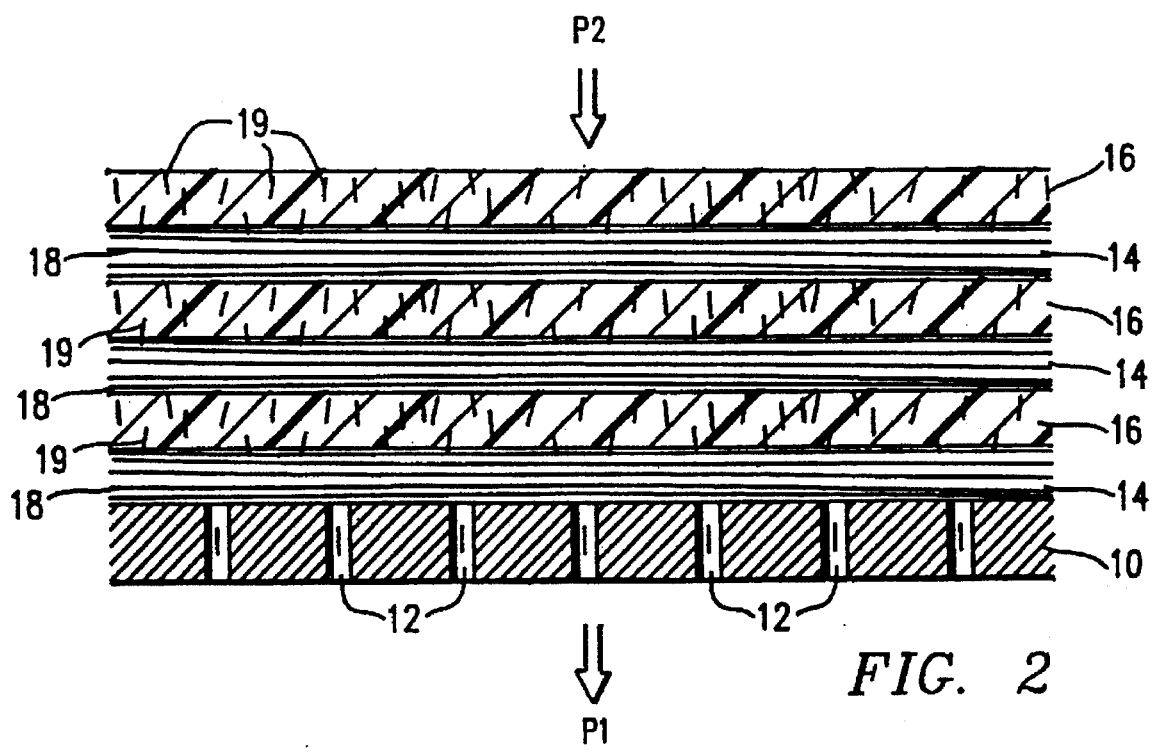
FIG. 2 is a schematic sectional illustration showing short fiber orientation resulting from an imposed pressure gradient across the laminar plies used in producing the composite buildup.

FIG. 2 illustrates the alternate layers of the composite buildup after a pressure gradient is established across the layers from the top to bottom. By way of example, the pressure gradient may be established by pulling a vacuum on the underside of the layup surface 10 to produce a low pressure $P_1$ while atmospheric pressure (or if desired a higher pressure) $P_2$ is established on the upper surface of top layer 16. As indicated schematically in FIG. 2, the liquid resinous material will follow the established pressure gradient and flow downwardly as viewed in the drawing. This will tend to cause the short fibers 19 in layers 16 to become oriented in the direction of flow to facilitate entry of the fibers into the interstitial spaces of the long fibers 19 to lock the several plies of reinforcing layers together. After the desired integration of the resin and reinforcing fiber layers, the matrix resin is cured to arrive at the final product.

The mechanism illustrated schematically in FIGS. 1 and 2 is to be contrasted with a conventional vacuum bag layup as shown, for example, in pages 268–270 of the Supplement Volume of the Kirk-Othmer. In the conventional procedure, the several plies are simply compressed together so that fluid pressure gradients are actually established more or less horizontally in the direction of the layers, thus tending to cause fiber orientation horizontally rather than vertically as viewed in FIGS. 1 and 2. In the present invention, by establishing a fluid pressure gradient in a direction normal to the fiber and resin layers, as well as by compressing the layers together, fluid flow and fiber orientation occur in a generally vertical direction.

The various thermoset resins such as those described above undergo a substantial decrease in volume when they are cured. Because of this shrinkage factor, warpage of composite structures is commonly experienced. While this phenomenon is observed in flat panels, it is particularly troublesome where composites are employed in forming curved structures such as ogival shapes encountered in nose cones or radar domes. For example, in the formation of elongated ogives of the type used as nose cones for missiles or high performance aircraft, the nose cone structure can be formed in two halves which are then joined together mechanically or by an adhesive to arrive at the final product. While the halves are formed on mold mandrels to very close tolerances, warpage of one or both components of the ogive structure causes difficulties when the components are joined. Where such curved structures such as those used for nose cones and heat shields and the like are formed integrally in one piece, it is still important that warpage be minimized in order to provide a good mating surface for securing the shaped curved structure to the remainder of the airframe.

The present invention substantially reduces the warpage of such composite structures. While the invention is not to be limited by theory, it is believed that the incorporation of the short fibers in the matrix material tends to minimize warpage by displacing a portion of the resin and also because of their interlocking action when extending into the interstitial spaces between the longer reinforcing fibers. The invention is thus particularly applicable to the formation of curved structures such as described above including structures in which a plurality of mating parts are formed separately and then joined together along their conforming mating surfaces.

In carrying out this aspect of the invention, each of the mating components is formulated from a plurality of layers of fiber reinforcing material which may be any of the fiber materials described previously. The layers of the fiber reinforcing material are conformed to a desired shape and integrated with the resinous matrix material comprising a mixture of the uncured thermoset resin and the short reinforcing fibers. The desired shape of the component may be arrived at by forming the reinforcing fiber and the matrix material on a suitable mold mandrel. For example, where the final product is a nose cone, each mating component may be ½ segment of the cone divided along the axis of the cone. Each component is formed on the mandrel using any of the conventional lay-up procedures as described previously, or employing the technique of FIGS. 1 and 2. After the components are cured and removed from their respective mold mandrels, they are then joined along their conforming mating surfaces to produce the final cone-shaped product. The component parts may be joined together along their seams by any suitable techniques such as by mechanical tongue and groove connections and/or by adhesive bonding with an epoxy or other suitable adhesive.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A fiber reinforced composite product comprising:
   (a) a plurality of plies of fiber reinforcing mats formed of elongated reinforcing fibers oriented generally in the planes of said fiber reinforcing mats, said elongated reinforcing fibers having interstitial spaces between said elongated reinforcing fibers;
   (b) a resin material providing a matrix in which said fiber reinforcing mats are disposed; and
   (c) short interlocking fibers having an average length within the range of 0.2–0.6 mm three dimensionally disposed in said resin material and extending into the interstitial spaces between said elongated reinforcing fibers of said fiber reinforcing mats,
   wherein the weight ratio of said short interlocking fibers to said resin material is within the range of 1.0, and
   wherein the elongated reinforcing fibers have an average length which is substantially greater than the average length of said short interlocking fibers.

2. A fiber reinforced composite product in accordance with claim 1, wherein the weight ratio of said short interlocking fibers to said resin material is within the range of 0.6–0.8.

3. A fiber reinforced composite product in accordance with claim 1 wherein the aspect ratio of said short reinforcing fibers is within the range of 10–50.

4. A fiber reinforced composite product comprising:
   a first fiber reinforcing mat, said first fiber reinforcing mat having a first surface and being formed of elongated reinforcing fibers oriented generally along said first surface, with interstitial spaces between the elongated reinforcing fibers of said first fiber reinforcing mat;
   a second fiber reinforcing mat, said second fiber reinforcing mat having a second surface and being formed of elongated reinforcing fibers oriented generally along said second surface, with interstitial spaces between the elongated reinforcing fibers of said second fiber reinforcing mat;
   said first and second reinforcing mats being positioned with said first surface facing said second surface; and
   a matrix layer formed of resin material and short interlocking fibers, said matrix layer encompassing at least a portion of the elongated reinforcing fibers of said first fiber reinforcing mat including said first surface and at least a portion of the elongated reinforcing fibers of said second fiber reinforcing mat including said second surface, with said short interlocking fibers being three dimensionally disposed in said resin material such that some of said short interlocking fibers extend through said first surface, some of said short interlocking fibers extend into interstitial spaces between the elongated reinforcing fibers of said first fiber reinforcing mat, some of said short interlocking fibers extend through said second surface, and some of said short interlocking fibers extend into interstitial spaces between the elongated reinforcing fibers of said second fiber reinforcing mat;
   wherein the short interlocking fibers have an average length within the range of 0.2–0.6 mm,
   wherein the weight ratio of said short interlocking fibers to said resin material in said matrix layer is within the range of 0.4–1.0, and
   wherein the elongated reinforcing fibers have an average length which is substantially greater than the average length of said short interlocking fibers.

5. A fiber reinforced composite product in accordance with claim 4, wherein the short interlocking fibers are aligned generally perpendicular to said first and second surfaces to assist in interlocking together said first and second fiber reinforcing mats.

6. A fiber reinforced composite product in accordance with claim 5, wherein the orientation of the short interlocking fibers is the result of an imposed pressure gradient across said first and second fiber reinforcing mats.

7. A fiber reinforced composite product in accordance with claim 5, wherein said first and second surfaces are in close juxtaposition to one another.

8. A fiber reinforced composite product in accordance with claim 7, wherein said fiber reinforced composite product has a relatively homogeneous cross-section in which the matrix layer is infused within said first and second fiber reinforcing mats without a substantial resin rich layer between said first and second fiber reinforcing mats.

9. A fiber reinforced composite product in accordance with claim 8, wherein said first and second fiber reinforcing mats are at least substantially completely penetrated by said matrix layer.

10. A fiber reinforced composite product in accordance with claim 5, wherein said short interlocking fibers have an aspect ratio which is in the range of 10 to 50.

11. A fiber reinforced composite product in accordance with claim 5, wherein said matrix layer has a weight ratio of said short interlocking fibers to said resin material which is in the range of 0.6 to 0.8.

12. A fiber reinforced composite product in accordance with claim 11, wherein said short interlocking fibers have an aspect ratio which is in the range of 10 to 50.

13. A fiber reinforced composite product in accordance with claim 4, wherein said short interlocking fibers have an aspect ratio which is in the range of 10 to 50.

14. A fiber reinforced composite product in accordance with claim 4, wherein said resin material is a thermoplastic material.

15. A fiber reinforced composite product in accordance with claim 4, wherein said resin material is a thermoset material.

16. A fiber reinforced composite product in accordance with claim 4, wherein each of the elongated reinforcing fibers has a length of at least about 3 centimeters.

17. A fiber reinforced composite product in accordance with claim 4, wherein each of said first and second fiber reinforcing mats is in the form of a braided structure in which the elongated reinforcing fibers extend predominantly along one direction.

* * * * *

UNITED STATES PATENT AND TRADEMARK OFFICE
CERTIFICATE OF CORRECTION

PATENT NO. : 5,637,375
DATED : June 10, 1997
INVENTOR(S) : Hohman

It is certified that error appears in the above-indentified patent and that said Letters Patent is hereby corrected as shown below:

Column 11, line 28, delete "of 1.0" and insert
    --of 0.4-1.0--.

Signed and Sealed this

Twenty-eighth Day of April, 1998

Attest:

BRUCE LEHMAN

Attesting Officer   Commissioner of Patents and Trademarks